United States Patent
Guo et al.

(10) Patent No.: US 10,733,022 B2
(45) Date of Patent: Aug. 4, 2020

(54) METHOD OF MANAGING DEDICATED PROCESSING RESOURCES, SERVER SYSTEM AND COMPUTER PROGRAM PRODUCT

(71) Applicant: EMC IP Holding Company LLC, Hopkinton, MA (US)

(72) Inventors: Fan Guo, Shanghai (CN); Kun Wang, Beijing (CN); Junping Zhao, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 94 days.

(21) Appl. No.: 16/166,568

(22) Filed: Oct. 22, 2018

(65) Prior Publication Data
US 2019/0171489 A1  Jun. 6, 2019

(30) Foreign Application Priority Data
Oct. 27, 2017  (CN) .......................... 2017 1 1029479

(51) Int. Cl.
*G06F 9/46*  (2006.01)
*G06F 9/50*  (2006.01)
(Continued)

(52) U.S. Cl.
CPC ............ *G06F 9/5027* (2013.01); *G06F 1/329* (2013.01); *G06F 9/485* (2013.01); *G06F 9/505* (2013.01); *G06F 9/5011* (2013.01); *G06F 9/5038* (2013.01); *H04L 41/5022* (2013.01); *G06F 2209/504* (2013.01); *G06F 2209/5013* (2013.01); *Y02D 10/22* (2018.01)

(58) Field of Classification Search
CPC ........ G06F 9/50; G06F 9/5011; G06F 9/5027; G06F 9/4881; G06F 2209/504; G06F 2209/5013; H04L 67/42; H04L 41/5009; H04L 41/5022; Y02D 10/22
See application file for complete search history.

(56) References Cited

U.S. PATENT DOCUMENTS

| 7,716,275 B1 * | 5/2010 | Nagaralu | ............. G06F 9/5011 |
| | | | 709/203 |
| 10,178,046 B1 * | 1/2019 | Murugesan | ........... G06F 9/5027 |

(Continued)

*Primary Examiner* — Tuan A Vu
(74) *Attorney, Agent, or Firm* — Ryan, Mason & Lewis, LLP

(57) ABSTRACT

Embodiments of the present disclosure provide a method of managing dedicated processing resources, a server system and a computer program product. The method may include receiving a request for the dedicated processing resources from an application having an assigned priority. The method may also include determining a total amount of resources to be occupied by the application based on the request. The method may further include, in response to the total amount of resources approximating or exceeding a predetermined quota associated with the priority, assigning, from the dedicated processing resources, a first amount of dedicated processing resources to the application. Besides, the method may include, in response to the application completing an operation associated with the request using the assigned dedicated processing resources, causing the application to sleep for a time period.

18 Claims, 5 Drawing Sheets

(51) Int. Cl.
  *G06F 1/329* (2019.01)
  *G06F 9/48* (2006.01)
  *H04L 12/24* (2006.01)

(56) References Cited

U.S. PATENT DOCUMENTS

2002/0065864 A1* 5/2002 Hartsell .............. H04L 41/5009
  718/100
2015/0188840 A1* 7/2015 Xiao .......................... G06F 9/50
  709/226
2015/0229579 A1* 8/2015 Kosim-Satyaputra ......................
  H04L 67/42
  709/225
2015/0347179 A1* 12/2015 Barraclough ......... G06F 9/4881
  718/103
2016/0077883 A1* 3/2016 Cypher .................... G06F 9/50
  718/104

* cited by examiner

METHOD OF MANAGING DEDICATED PROCESSING RESOURCES, SERVER SYSTEM AND COMPUTER PROGRAM PRODUCT

RELATED APPLICATIONS

This application claims priority from Chinese Patent Application Number CN 201711029479.1, filed on Oct. 27, 2017 at the State Intellectual Property Office, China, titled "A METHOD FOR MANAGING DEDICATED PROCESSING RESOURCE, A SERVER SYSTEM AND A COMPUTER PROGRAM PRODUCT" the content of which is incorporated herein by reference in its entirety.

FIELD

Embodiments of the present disclosure generally relate to the field of computer resource management, and more specifically, to a method of managing dedicated processing resources, a server system and a computer program product.

BACKGROUND

Currently, a number of data processing and computing tasks are implemented depending on dedicated processing resources. For example, a graphics processing unit (GPU) is a known dedicated processor which is applied to a computer, a work station, a game console and a mobile device for accelerated calculation. Using the GPU and a central processing unit (CPU) simultaneously, GPU accelerated calculation can be provided. The GPU accelerated calculation can transfer a computation-intensive workload of the application program to the GPU, while the remaining program code is still executed by the CPU. From a user's perspective, the operating speed of the application program is remarkably accelerated.

Nowadays, in order to provide better service to a computation-intensive task, such as high-performance computing (HPC), machine learning (ML), deep learning (DL) or the like, a GPU instance is deployed in more and more public clouds or data centers, for use by these computation-intensive tasks. The GPU instance deployed in these public clouds or data centers is shared by applications of different tenants. However, it is only a simple attempt to deploy the GPU instance in these public clouds or data centers, which has been at an initial phase so far. Up to now, there still lacks a solution of controlling quality of service (QoS) of resources in the shared GPU among a plurality of applications. Other types of dedicated processing resources are also confronted with a similar problem.

SUMMARY

Embodiments of the present disclosure provide a solution of managing dedicated processing resources.

In a first aspect of the present disclosure, there is provided a method of managing dedicated processing resources. The method may include receiving a request for the dedicated processing resources from an application with an assigned priority. The method may also include determining, based on the request, a total amount of resources to be occupied by the application. The method may further include, in response to the total amount of resources approximating or exceeding a predetermined quota associated with the priority, allocating, from the dedicated processing resources, a first amount of dedicated processing resources to the application. In addition, the method may include, in response to the application completing an operation associated with the request using the allocated dedicated processing resources, causing the application to sleep for a time period.

In a second aspect of the present disclosure, there is provided a server system. The server system may include dedicated processing resources and a controller. The controller may be configured to receive a request for the dedicated processing resources from an application having an assigned priority. The controller may also be configured to determine, based on the request, a total amount of resources to be occupied by the application. The controller may be further configured to, in response to the total amount of resources approximating or exceeding a predetermined quota associated with the priority, allocate a first amount of dedicated processing resources to the application from the dedicated processing resources. In addition, the controller may be configured to, in response to the application completing an operation associated with the request using the allocated dedicated processing resources, cause the application to sleep for a time period.

In a third aspect of the present disclosure, there is provided a computer program product tangibly stored on a nonvolatile computer-readable medium and having machine-executable instructions when executed, causing a machine to implement a method of managing dedicated processing resources.

This Summary is provided to introduce a selection of concepts in a simplified form that will be further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description of the example embodiments of the present disclosure with reference to the accompanying drawings, the above and other objectives, features, and advantages of example embodiments of the present disclosure will become more apparent, and wherein, in the example embodiments of the present disclosure, the same reference symbols refer to the same elements.

DETAILED DESCRIPTION OF EMBODIMENTS

Figure 1:
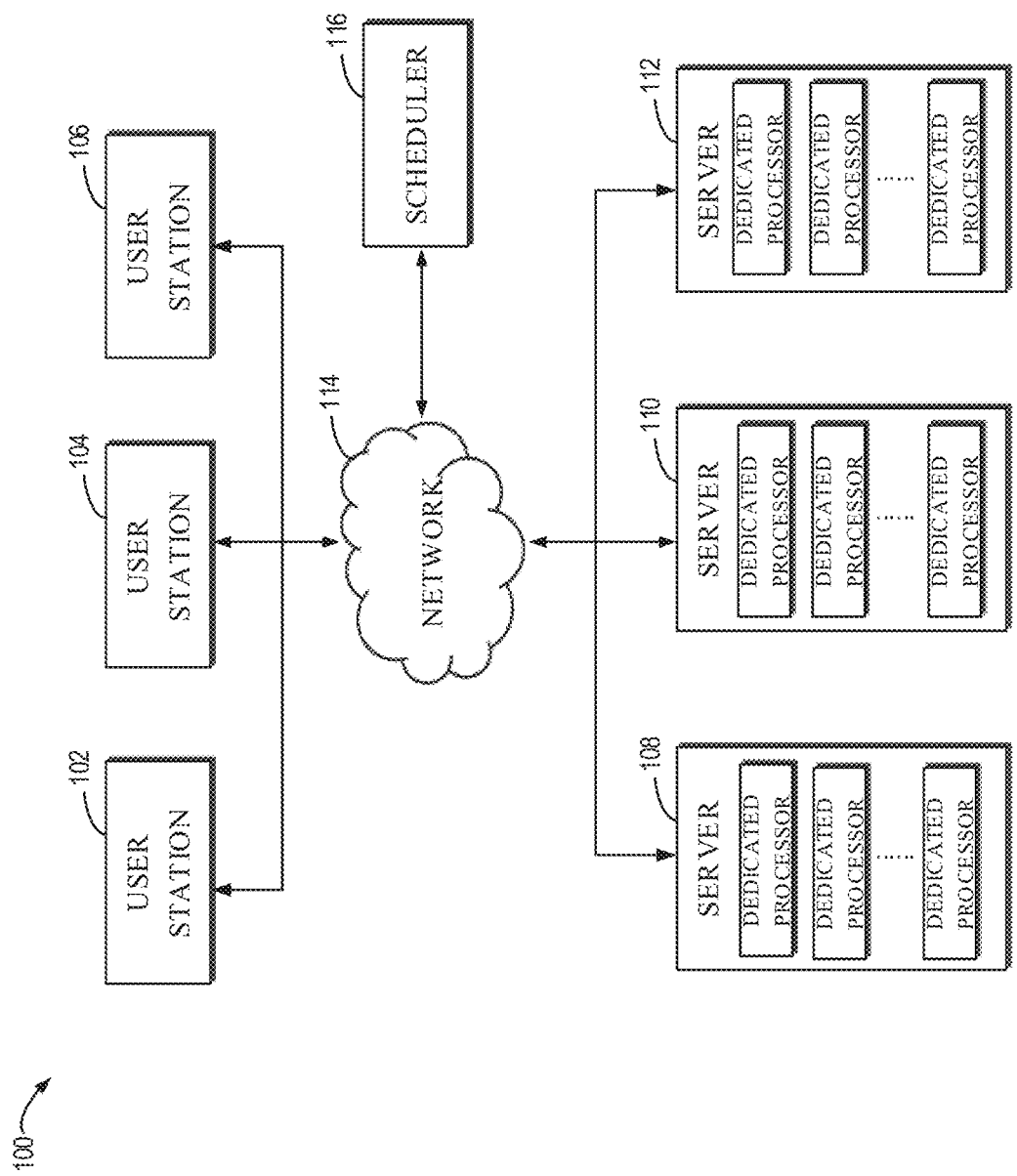
FIG. 1 illustrates a shared environment for providing dedicated processing resources to a plurality of applications.

Principles of the present disclosure will now be described with reference to several example embodiments illustrated in the drawings. Although the drawings illustrate example embodiments of the present disclosure, it should be appreciated that description of those embodiments is merely to enable those skilled in the art to better understand and further implement the present disclosure and is not intended for limiting the scope disclosed herein in any manner.

FIG. 1 illustrates an environment 100 for providing shared dedicated processing resources to a plurality of applications. The environment 100 for example may be a cloud-based environment. As shown therein, the environment 100 includes a first user station 102, a second user station 104, a third user station 106, a first server 108, a second server 110, a third server 112, a network 114 and a scheduler 116. Although FIG. 1 illustrates three user stations 102, 104, 106 and three servers 108, 110, 112, those skilled in the art would appreciate that the environment 100 may include any number of user stations and any number of servers.

The user stations 102, 104, 106 may be user devices connected via the network 114 to the servers 108, 110, 112, such as a desktop computer, a laptop computer, a tablet, a smart phone, or the like. Client applications may be run on the user stations 102, 104 and 106. For example, rather than in a limiting manner, a high-performance computing (HPC) application may run on the first user station 102, a machine learning (ML) application may run on the second user station 104, and a deep learning (DL) application may run on the third user station 106.

The first server 108, the second server 110 and the third server 112 provide a shared dedicated processor, such as a GPU, for the applications running on the user stations 102, 104 and 106, to provide accelerated calculation. Each of the servers 108, 110, 112 may include one or more dedicated processors. In addition to the dedicated processors, each of the servers 108, 110 and 112 may include other components not shown, for example a storage system and a general processor such as a central processing unit (CPU), or the like. The scheduler 116 may be responsible for assigning the dedicated processors in the servers 108, 110 and 112 to the client applications running on the user stations 102, 104 and 106.

In the environment having a shared dedicated processor, for example the environment 100 as shown in FIG. 1, a plurality of applications from a same tenant or different tenants (for example, an HPC application, a ML application and a DL application) may be present simultaneously and run on the same dedicated processor. A problem to be considered is how to enable a plurality of applications to efficiently use such a shared dedicated processor, particularly how to efficiently use the processing resources in the shared dedicated processor. However, there has not been an effective solution for providing a control of quality of service (QoS) of dedicated processing resources for a plurality of applications in the cloud environment. Besides, in the current hardware architecture of the dedicated processor, although usage of the resources may be queried through some application program interfaces (API), the QoS control ability at an application level is not provided.

Therefore, embodiments of the present disclosure provide a solution of managing dedicated processing resources, so as to enable an application of a high priority or a tenant of a high service level agreement to acquire the dedicated processing resources more easily, and to minimize the influence on each application program as much as possible in terms of code, rebuilding or running results.

In embodiments of the present disclosure, a predetermined quota associated with a priority of an application is set for an application. The predetermined quota increases with the increase of the priority. The predetermined quota indicates an upper limit of the dedicated processing resources allowed to be used by the application. In response to receiving from the application a request for the dedicated processing resources, the request is analyzed to derive a requested amount of resources. Based on the requested amount of resources and the amount of resources already occupied by the application in the dedicated processing resources, a total amount of resources to be occupied by the application in the dedicated processing resources is determined. If the total amount of resources is close to or exceeds the predetermined quota (i.e., the upper limit), the requested amount of resources is still allocated from the dedicated processing resources. After the application completes an operation associated with the request using the allocated dedicated processing resources, the application sleeps for a time period, which acts as a punishment for exceeding the upper limit. A length of the time period is positively correlated with a difference of the total amount of resources exceeding the predetermined quota.

By setting, for an application, a quota associated with the priority of the application, it can be ensured that an application of a high priority is able to acquire more dedicated processing resources, such as a GPU kernel, than an application of a low priority thus the application of a low priority has less influence on the application of a high priority. On the other hand, if the request for the dedicated processing resources results in the total amount of resources to be occupied by the application is close to or exceeds the predetermined quota, the requested amount of resources is still allocated to the application, thus ensuring the application to continue running normally. After the application completes the operation associated with the request, the application sleeps for a time period, which ensures fairness of each application in terms of use of the dedicated processing resources.

In the following description with reference to FIG. 2, for clarity and brevity, the GPU kernel is mainly taken as an example for describing the example embodiments of the present disclosure in detail. As it is known, the outstanding computation ability of the GPU as a dedicated processor is based on a large amount of kernels and a high-bandwidth memory. In GPU hardware architecture, a GPU often includes a large amount of GPU kernels, for example 5,120 or nearly 10,000 kernels. The GPU kernel, as a type of dedicated processing resource, is a fundamental processing unit, which is also referred to as a stream processor (SP). Instructions and tasks are ultimately processed on the GPU kernels. A plurality of GPU kernels execute instructions simultaneously, thereby implementing parallel computation of the GPUs. A plurality of SPs, together with some other resource, for example a register and a shared memory, may constitute a stream multiprocessor (SM).

However, it would be appreciated that the GPU is only an example of a dedicated processing resource, which is not provided for limiting the scope of the present disclosure. The spirits and principles described herein are applicable to other dedicated processing resources regardless of whether currently known or developed in the future, for example the processing resource may be implemented in an accelerator such as a field programmable gate array (FPGA), rather than merely limited to the GPU kernel.

Figure 2:
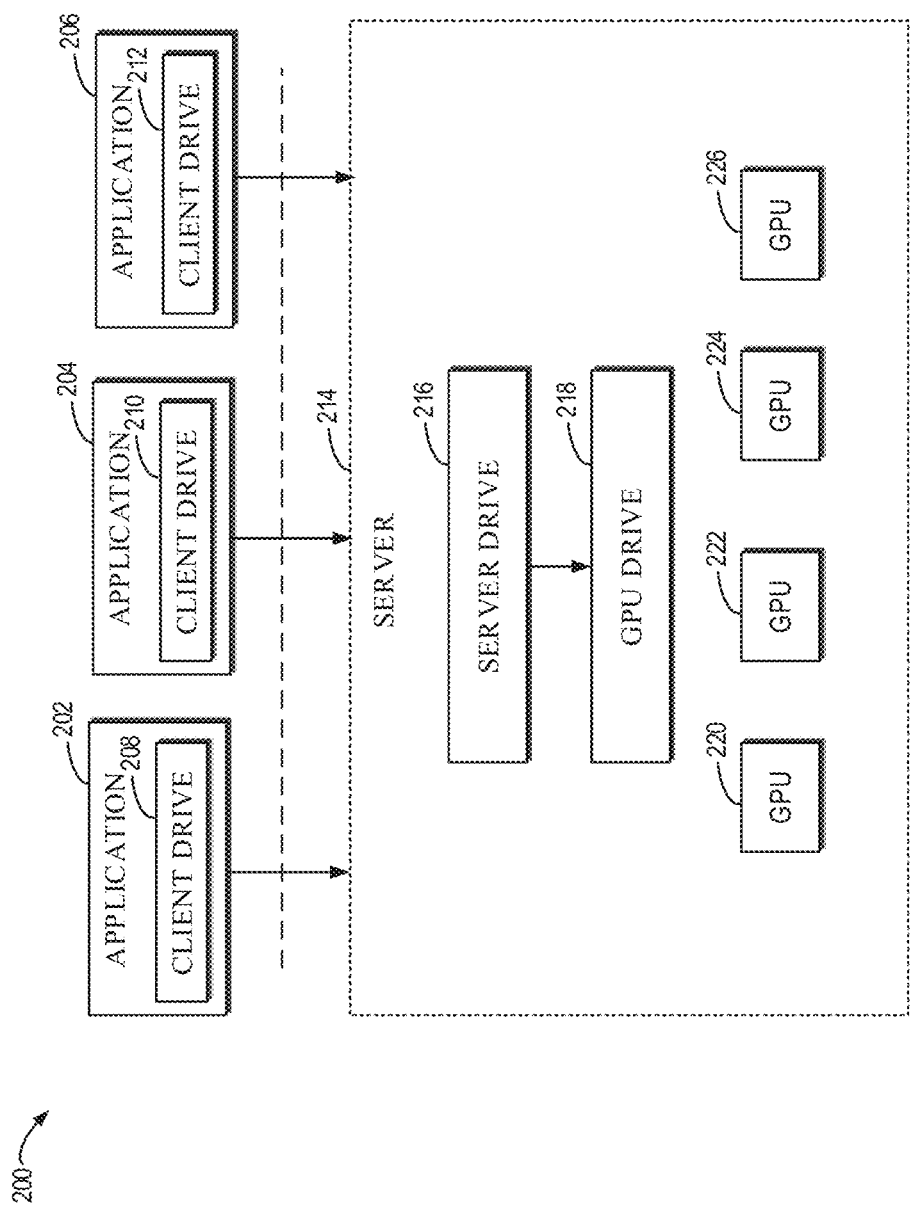
FIG. 2 is a diagram illustrating architecture in accordance with embodiments of the present disclosure.

FIG. 2 is a diagram illustrating architecture in accordance with embodiments of the present disclosure. It would be appreciated that some components as shown in FIG. 2 may be omitted, and in other embodiments, the architecture 200 may include other components not shown therein. That is, the diagram of FIG. 2 is provided for describing embodiments of the present disclosure to aid those skilled in the art in understanding the mechanism and principles described herein, without any intention to limit the scope of the present disclosure in any manner.

The architecture 200 includes a first application 202, a second application 204, a third application 206 and a server 214. These applications 202, 204 and 206 may be GPU applications developed by the same tenant or different tenants, such as a high performance computing (HPC) application, a machine learning (ML) application, a deep learning (DL) application and the like. Each computation-intensive section in the first application 202, the second application 204 and the third application 206 may be executed by one or more of the GPUs 220, 222, 224 and 226 in the server 214.

The tenant may set a predetermined quota for its application based on its service level agreement. In an embodiment, the set predetermined quota increases as the service level agreement increases. The service level agreement reflects the priority of the application. The predetermined quota may be set in different manners, for example in an absolute manner or a relative manner. In one embodiment, there are three types of quotas. In Type 1, the quota is an absolute number, for example 4090 GPU kernels. In Type 2, the quota is a proportion of all GPU kernels, for example 50% of all GPU kernels. In Type 3, the quota is a proportion of available GPU kernels, for example 50% of available GPU kernels.

The applications 202, 204 and 206 may transfer their respective quota to the server 214. Only as an example, in one embodiment, the applications 202, 204 and 206 may transfer the quota to the server 214 in a predetermined request format <AppID, quotaType, quotaSetting>, in response to a first start-up. AppID denotes an identifier of the application, and each application may have a unique identifier. QuotaType denotes a quota type, such as Type 1, Type 2 or Type 3 as described above. QuotaSetting denotes a quota value, such as 4096 or 50%.

Under the architecture 200, each of the applications 202, 204 and 206 are dynamically loaded therein with a client drive, for example a client drive 208, 210 or 212. The client drive may intercept all requests of the corresponding application related with the GPU, for example requests for the GPU kernel, and forward the intercepted requests to the server 214 for processing. The applications 202, 204 and 206 are dynamically loaded with client drives 208, 210 and 212, respectively, to intercept requests related with the GPU, and may interact with the server 214 to implement the solution of the present disclosure without modifying any code. Hence, the solution of the present disclosure is transparent, from the perspective of application.

The server 214 includes a server drive 216, a GPU drive 218 and a plurality of GPUs 220, 222, 224 and 226. The GPU drive 218 is similar to the conventional GPU drive, and its details are thus omitted herein. The server drive 216 may receive from the application a request in a format <AppID, quotaType, quotaSetting>, and extract information related with the quota from the request.

The server drive 216 may maintain the following information for each application: an identifier of the application; a type of quota, for example Type 1, Type 2 or Type 3 as described above; a value of a quota which may be an absolute value or a relative value; an amount of CPU kernels already used, which may be an absolute value or a relative value; policies employed when a total amount of GPU kernels to be occupied by the application exceeds a predetermined quota, for example a suspending policy, a post-punishment policy, resource re-sizing policy and the like, which will be described below in detail. Apart from the above information, the server drive 216 may also maintain information at a system level, including a total number of kernels and a number of used kernels or kernel utilization of the system.

The server drive 216 may receive a request for the GPU kernel from any one of the first application 202, the second application 204 and the third application 206 (for example, the first application 202). The server drive 216 determines a total amount of GPU kernels to be used by the first application 202, based on the request and the maintained amount of GPU kernels already used by the first application 202. In response to the total amount of GPU kernels to be used by the first application 202 approximating or exceeding a predetermined quota associated with the first application 202, for example the total amount of GPU kernels reaching a certain proportion of the predetermined quota (for example, 90% or any other appropriate numerical values), the server drive 216 adopts a corresponding policy.

In one embodiment of the present disclosure, the policy adopted by the server drive 216 is to assign the requested amount of GPU kernels to the first application 202, so as to satisfy a current need of the first application 202. In response to the first application 202 completing the associated operation using the assigned GPU kernels, the first application 202 sleeps for a time period. A length of the time period is positively correlated with a difference of the total amount of kernels exceeding the predetermined quota, i.e., the greater the total amount of kernels exceeding the predetermined quota, the longer the first application 202 sleeps. A compute unified device architecture (CUDA) computing platform will be taken as an example to describe in detail how to determine the sleep time.

For ease of understanding, some basic concepts of CUDA are introduced. The CUDA is a type of general-purpose parallel computing architecture which allows the GPU to solve a complicated computing problem. The main computing task of the CUDA application is implemented by a so-called kernel function. In brief, the kernel function is a piece of code executed on the GPU. The kernel function typically uses a large amount of threads to complete a computing task. The CUDA encapsulates the threads into a 3-layer structure, namely a thread, a block and a grid. The block consists of a plurality of threads, and a grid is comprised of a plurality of blocks. The threads within the same block may synchronize or communicate via a shared memory. One block can be executed only on a SM of the GPU, and a plurality of blocks may share a SM. When the CUDA drive submits a kernel function, a GPU scheduler may schedule the blocks in the kernel function.

In the case of CUDA, the following equation (1) may be used to calculate the sleep time:

$$\underbrace{\frac{KernelBlockNum}{(ActiveBlockNum * GPUTotalSMNum)*}}_{\text{App quota}} = \frac{runningTime + (sleepTime)}{runningTime} \quad (1)$$

where KernelBlockNum indicates a number of blocks in the kernel function, ActiveBlockNum indicates a number of blocks that a SM is able to execute simultaneously, and GPUTotalSMNum indicates a total number of SMs in the GPU.

$$\frac{KernelBlockNum}{(ActiveBlockNum * GPUTotalSMNum)}$$

in the equation (1) reflects the GPU kernel occupancy rate of the kernel function. In the CUDA architecture, KernelBlockNum, ActiveBlockNum and GPUTotalSMNum may be derived via the API provided by CUDA. App quota indicates a predetermined quota of the application, runningTime indicates time for which the application has been running, and sleepTime indicates sleep time to be calculated. Those skilled in the art would appreciate that the equation (1) is merely an example of calculating sleep time, and embodiments of the present disclosure are not limited to it.

In another embodiment of the present disclosure, the policy adopted by the server drive 216 is to suspend the first application 202 until the first application 202 releases a part of used GPU kernels. For example, in the CUDA architecture, the server drive 216 may suspend a current kernel function of the first application 202 until the preceding kernel function of the first application 202 releases a part of GPU kernels. In order to avoid influence on the performance resulting from the first application 202 being suspended all the time, a maximum suspending time may be set. In response to the time elapsed since the first application 202 was suspended exceeding the maximum suspending time and the previous kernel function not releasing any GPU kernel, the suspended kernel function of the first application 202 may be recovered.

In another embodiment of the present disclosure, the policy adopted by the server drive 216 is to enable the first application 202 to continue running, but to allocate, to the first application 202, an amount of GPU kernels less than the amount of GPU kernels requested by the first application 202. For example, in the CUDA architecture, the number of used SM may be reduced by decreasing the number of threads in the kernel function. For another example, the number of kernels used by each block may be reduced by decreasing the number of threads in each block.

Controlling quality of service (QoS) of the GPU kernels at the server side has been described above. In another embodiment of the present disclosure, the QoS of the GPU kernels may be controlled at the client side. For example, each of the client drives 208, 210 and 212 may obtain utilization of the GPUs 220, 222, 224 and 226 at the server 214. In response to the utilization always exceeding a threshold within a time period, the client drives 208, 210 and 212 may place the intercepted requests related with the GPU into a queue, instead of immediately sending them to the server 214, so as to alleviate the pressure at the server 214.

Figure 3:
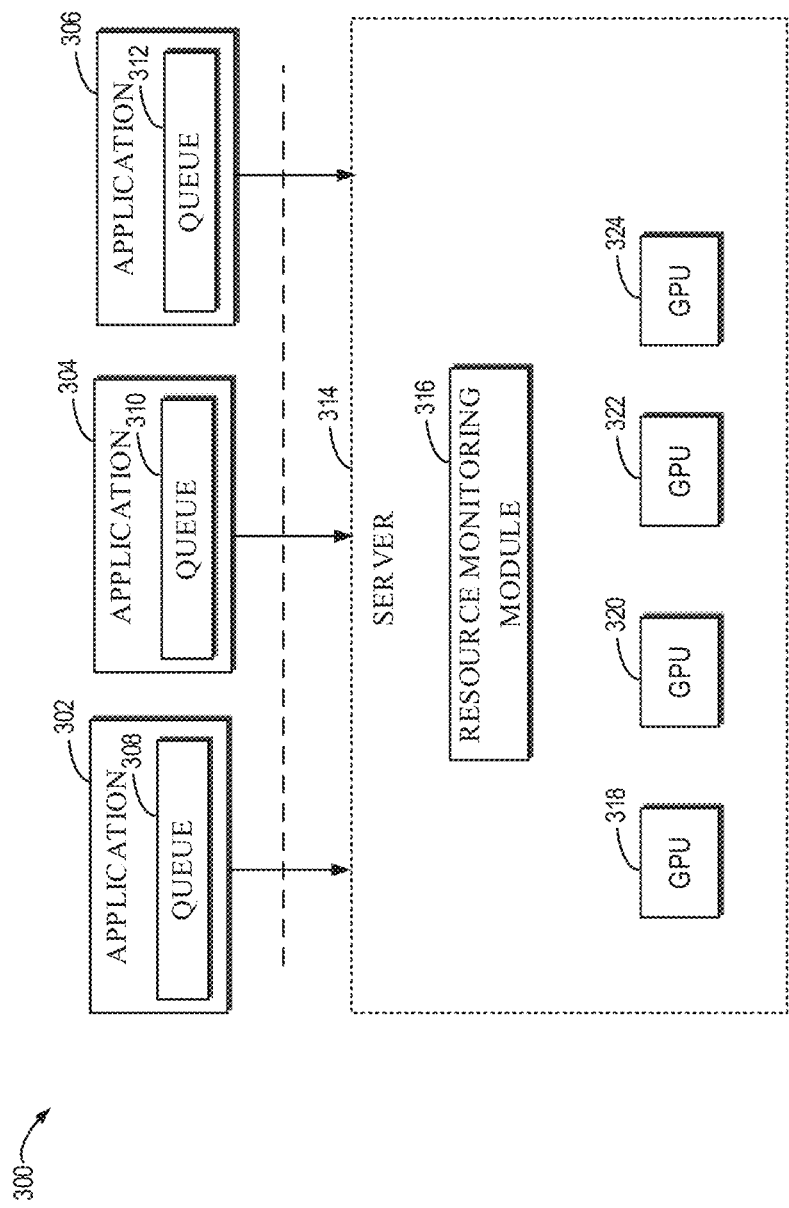
FIG. 3 is a diagram illustrating architecture in accordance with embodiments of the present disclosure.

Control of QoS of the GPU kernels may be implemented systematically at the server side and the client side. The control manner will be described with reference to FIG. 3. FIG. 3 is a diagram illustrating architecture 300 in accordance with embodiments of the present disclosure. The architecture 300 includes a first application 302, a second application 304, a third application 306 and a server 314. The first application is provided with a queue 308, the second application is provided with a queue 310, and third application is provided with a queue 312.

The server 314 includes a resource monitoring module 316 and a plurality of GPUs 318, 320, 322 and 324. In the architecture 300, no control measurement is used initially at the client side, and thus the first application 302, the second application 304 and the third application 306 may continuously send requests to the server 314. The resource monitoring module 316 may detect utilization of GPUs 318, 320, 322 and 324. In response to the utilization of GPUs 318, 320, 322 and 324 always exceeding a threshold within a time period, the resource monitoring module 316 may send signals to an application of the lowest priority among the first application 302, the second application 304 and the third application 306, to instruct the application to defer sending the subsequent requests for the GPU kernels. The application may place the subsequent requests into the respective queues, in response to receiving the signal. In one embodiment, the resource monitoring module 316 may send the signal to all the applications 302, 304 and 306, to instruct them to defer sending the subsequent requests for the GPU kernels.

In the architecture 300, the resource monitoring module 316 may implement the function of the server drive 216 in FIG. 2. For example, the resource monitoring module 316 may receive the requests for the GPU kernels from the first application 302, determine a total amount of GPU kernels to be occupied by the first application 302, and adopts a respective policy, in response to the total amount of GPU kernels to be occupied by the first application 302 exceeding the predetermined quota associated with the first application 302. For example, the requested amount of GPU kernels may be assigned to the first application 302, and in response to the first application 302 completing the associated operation using the assigned kernels, the first application 302 sleeps for a time period. A length of the time period is positively correlated with a difference of the total amount of kernels occupied by the first application 302 exceeding the predetermined quota. For another example, the first application 302 may be suspended until the first application 302 releases a part of the used GPU kernels. For a further example, the first application 302 may continue running, but the amount of GPU kernels assigned to the first application 302 is less than the amount of GPU kernels requested by the first application 302.

In the architecture 300 as shown in FIG. 3, the client side and the server side are coordinately involved in management of the CPU kernels, such that the quality of service (QoS) control on the GPU kernels are scattered to the server side and the client side, thereby lessening the burden on the server side and avoiding overloading of the server.

Figure 4:
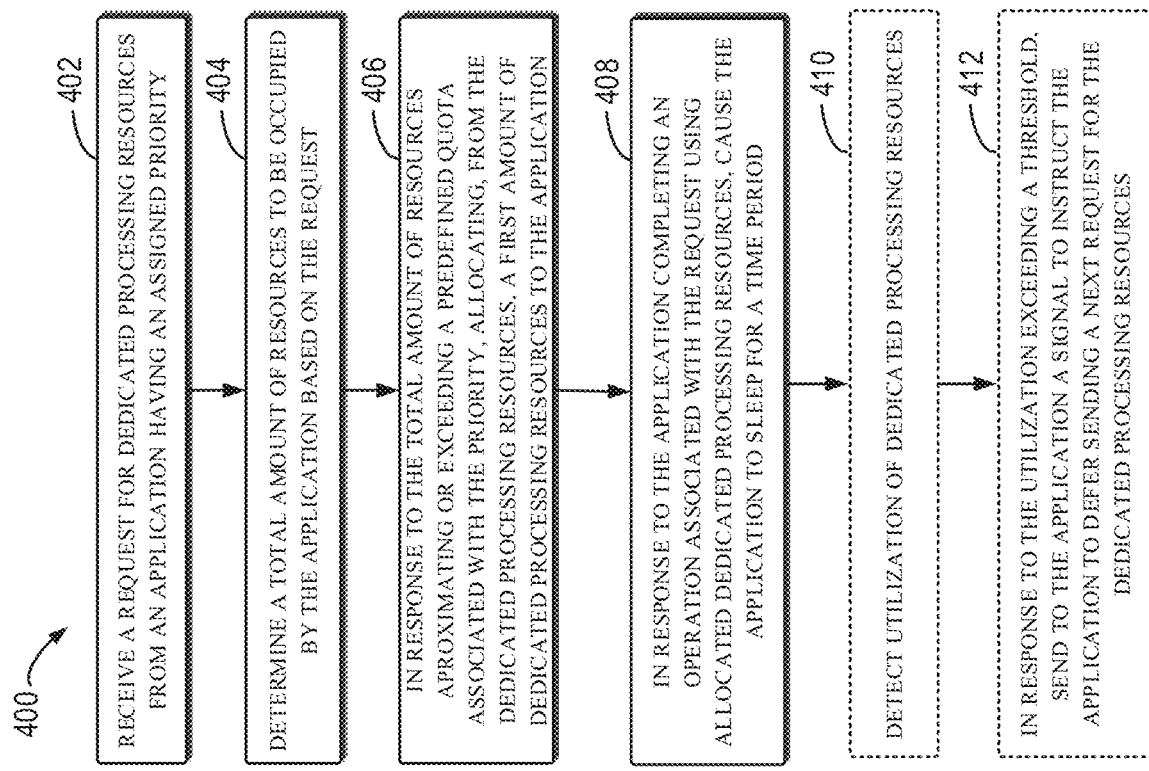
FIG. 4 is a flow chart illustrating a method of managing dedicated processing resources in accordance with the present disclosure.

FIG. 4 is a flowchart of a method 400 of managing dedicated processing resources in accordance with the embodiments of the present disclosure. The method 400 may be executed by the server drive 216 as shown in FIG. 2 or the resource monitoring module 316 as shown in FIG. 3.

In a block 402, a request for dedicated processing resources is received from an application having an assigned priority level. In one embodiment of the present disclosure, the priority of the application is associated with a service level agreement of a tenant developing the application. The higher the service level agreement is, the higher the priority is. The dedicated processing resources may include GPU kernels or processing resources of an accelerator, such as FPGA and the like.

In a block 404, a total amount of resources to be occupied by the application in the dedicated processing resources is determined based on the request. In one embodiment of the present disclosure, the total amount of resources may be determined based on the requested amount of resources and the amount of resources already occupied by the application in the processing resources.

In a block 406, in response to the total amount of resources approximating or exceeding a predetermined quota associated with the priority, allocating, from the dedicated processing resources, a first amount of dedicated processing resources to the application. In one embodiment of the present disclosure, the predetermined quota associated with the priority is set by a tenant developing the application, and an indication of the predetermined quota may be received from the application in advance. For example, at initial start-up, the application may send the indication of the predetermined quota to the server via a request in a predetermined format. In one embodiment of the present disclosure, the first amount may be equal to the requested amount of resources so as to satisfy the current need of the application, without affecting the current running of the application.

In a block 408, in response to the application completing an operation associated with the request using the allocated dedicated processing resources, the application is caused to sleep for a time period. In one embodiment of the present disclosure, a length of the time period is positively correlated with a difference of the total amount of resources exceeding the predetermined quota, i.e., the greater the total amount of resources exceeds the predetermined quota, the longer the length of the time period is. In this way, the current need of the application is satisfied, while fair use of the dedicated processing resources by each application is also taken into account.

In the method 400, associating the predetermined quota with the priority assigned to the application can ensure that the application of a high priority is able to acquire more dedicated processing resources than the application of a low priority, for example GPU kernels, such that the application of a low priority exerts less influence on the application of a high priority. On the other hand, if the request for dedicated processing resources results in the total amount of resources to be occupied by the application approximating or exceeding the predetermined quota; the requested amount of resources is still assigned to the application. In this way, it can be ensured that the application can continue running normally. As a punishment, after the application completes the operation associated with the request, the application is caused to sleep for a time period, which in turn ensures overall fairness of each application in use of the dedicated processing resources.

In a preferred embodiment of the present disclosure, the method 400 may further include optional blocks 410 and 412. In the block 410, utilization of the dedicated processing resources may be detected. In the block 412, in response to the utilization exceeding a predetermined threshold, for example the utilization having exceeded the predetermined threshold for a time period, a signal is sent to the application to instruct the application to defer sending a next request for the dedicated processing resources. In such a manner, the client side may also participate in management of the dedicated resource, so that control of the quality of service of the dedicated source is scattered at the server side and the client side, thereby alleviating the burden of the server side and avoiding overload of the server.

The solution provided in the present disclosure is tested by two clients simultaneously executing a matrix multiplication on the shared GPU. A service level agreement (i.e., a priority) of a first client of the two clients is higher than a service level agreement of the second client. In the case where the solution provided in the present disclosure is not used, a time of implementing the matrix multiplication by the first client is 177.377 milliseconds, a time of implementing the matrix multiplication by the second client is 177.352 milliseconds. As can be seen, there is nearly no difference between the first and second clients.

In the case where the solution provided by the present disclosure is used, since the priority of the first client is higher than that of the second client, the predetermined quota of the first client is greater than that of the second client. The time of implementing the matrix multiplication by the first client is 120.518 milliseconds, and the time of implementing the matrix multiplication by the second client is 358.901 milliseconds. There is a large difference between the first and second clients. In this way, different quality of service (QoS) can be provided to clients of different priorities.

Figure 5:
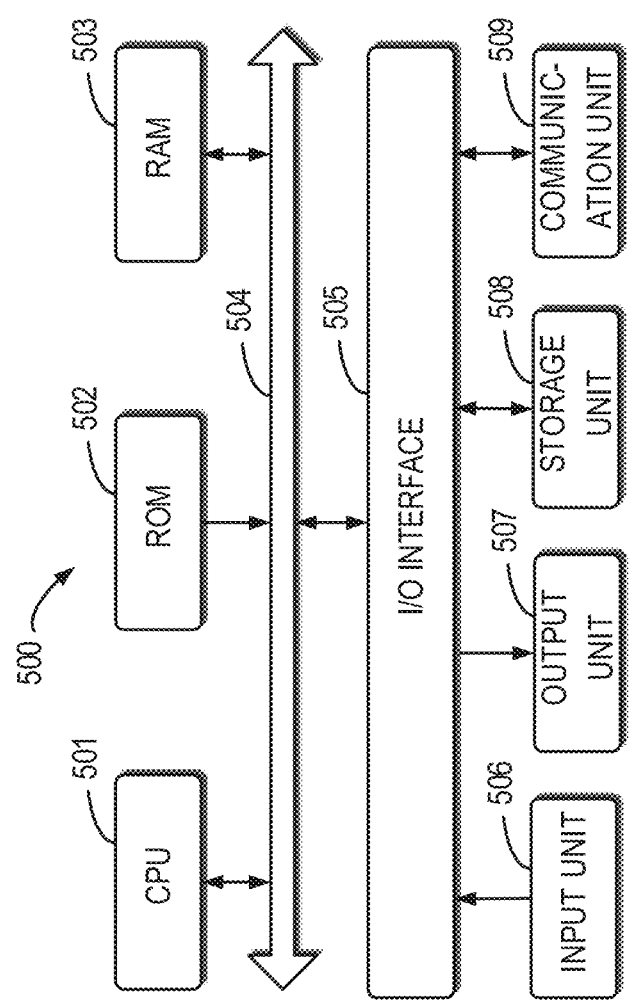
FIG. 5 is a block diagram illustrating an example apparatus for implementing embodiments of the present disclosure.

FIG. 5 is a block diagram illustrating an example apparatus 500 for implementing embodiments of the present disclosure. As shown therein, the apparatus 500 includes a central processing unit (CPU) 501 that may perform various appropriate actions and processing based on computer program instructions stored in a read-only memory (ROM) 502 or computer program instructions loaded from a storage unit 508 to a random access memory (RAM) 503. In the RAM 503, there further store various programs and data needed for operations of the apparatus 500. The CPU 501, ROM 502 and RAM 503 are connected to each other via a bus 504. An input/output (I/O) interface 505 is also connected to the bus 504.

The following components in the apparatus 500 are connected to the I/O interface 505: an input 506 such as a keyboard, a mouse and the like; an output unit 507 including various kinds of displays and a loudspeaker, etc.; a storage unit 508 including a magnetic disk, an optical disk, and etc.; a communication unit 509 including a network card, a modem, and a wireless communication transceiver, etc. The communication unit 509 allows the apparatus 500 to exchange information/data with other devices through a computer network such as the Internet and/or various kinds of telecommunications networks.

Various processes and processing described above, e.g., the method 400, may be executed by the processing unit 501. For example, in some embodiments, the method 400 may be implemented as a computer software program that is tangibly embodied on a machine readable medium, e.g., the storage unit 508. In some embodiments, part or all of the computer programs may be loaded and/or mounted onto the device 500 via ROM 502 and/or communication unit 509. When the computer program is loaded to the RAM 503 and executed by the CPU 501, one or more steps of the method 400 as described above may be executed. Alternatively, in other embodiments, the CPU 501 may be configured in any other appropriate manners (e.g., by means of firmware) to implement the method 400.

It would be appreciated by those skilled in the art that each step of the method disclosed herein may be implemented by a general computing device, they may be centralized on a single computing device or distributed over a network consisting of a plurality of computing devices, and alternatively, they may be implemented by computing device-executable program code so that they can be stored in the storage device and executed by the computing device, or they are respectively produced as an integrated circuit module, or a plurality of modules or steps therefrom are produced as a single integrated circuit module. As such, the present disclosure is not limited to any particular combination of hardware and software.

It will be noted that although various units or sub-units of the apparatus have been mentioned in the above detailed description, such partitioning is only exemplary, but not for limitation. In practice, according to the embodiments of the present invention, the features and functions of two or more units described above may be embodied in one unit. In turn, the features and functions of one unit described above may be further embodied in more units.

The above disclosed are only optional embodiments, but not provided for limiting the present disclosure, and for those skilled in the art, the present disclosure may allow various modifications and changes. Within the spirit and principles of the present disclosure, any modification, equivalent substitution, improvement, etc., shall be covered in the protection scope of the present disclosure.

We claim:

1. A method of managing dedicated processing resources, the method implemented with a computer system equipped with at least one processor having thereon memory-stored instructions which, when executed by the processor, cause the processor to perform the method, comprising:
   receiving a request for the dedicated processing resources from an application with an assigned priority;
   determining, based on the request, a total amount of resources to be occupied by the application;
   in response to the total amount of resources approximating or exceeding a predetermined quota associated with the priority, allocating a first amount of dedicated processing resources from the dedicated processing resources to the application; and
   in response to the application completing an operation associated with the request using the allocated dedicated processing resources, causing the application to sleep for a time period.

2. The method according to claim 1, wherein a length of the time period is positively correlated with a difference of the total amount of resources exceeding the predetermined quota.

3. The method according to claim 1, wherein causing the application to sleep for a time period comprises:
   in response to receiving a next request for the dedicated processing resources from the application, causing the application to sleep.

4. The method according to claim 1, further comprising:
   detecting utilization of the dedicated processing resources; and
   in response to the utilization exceeding a predetermined threshold, sending a signal to the application to instruct the application to defer sending of a next request for the dedicated processing resources.

5. The method according to claim 1, further comprising:
   receiving an indication of the predetermined quota from the application.

6. The method according to claim 1, wherein the priority is associated with a service level agreement for the application.

7. A server system, comprising:
   dedicated processing resources; and
   a controller configured to:
      receive a request for the dedicated processing resources from an application with an assigned priority,
      determine, based on the request, a total amount of resources to be occupied by the application,
      in response to the total amount of resources approximating or exceeding a predetermined quota associated with the priority, allocate a first amount of dedicated processing resources from the dedicated processing resources to the application, and
      in response to the application completing an operation associated with the request using the allocated dedicated processing resources, cause the application to sleep for a time period.

8. The server system according to claim 7, wherein a length of the time period is positively correlated with a difference of the total amount of resources exceeding the predetermined quota.

9. The server system according to claim 7, wherein the controller is configured to:
   in response to receiving a next request for the dedicated processing resources from the application, cause the application to sleep.

10. The server system according to claim 7, wherein the controller is further configured to:
    detect utilization of the dedicated processing resources; and
    in response to the utilization exceeding a predetermined threshold, send a signal to the application to instruct the application to defer sending of a next request for the dedicated processing resources.

11. The server system according to claim 7, wherein the controller is further configured to:
    receive an indication of the predetermined quota from the application.

12. The server system according to claim 7, wherein the priority is associated with a service level agreement for the application.

13. A computer program product being tangibly stored on a nonvolatile computer-readable medium and comprising machine-executable instructions which, when executed, cause a machine to perform a method of managing dedicated processing resources, the method comprising:
    receiving a request for the dedicated processing resources from an application with an assigned priority;
    determining, based on the request, a total amount of resources to be occupied by the application;
    in response to the total amount of resources approximating or exceeding a predetermined quota associated with the priority, allocating a first amount of dedicated processing resources from the dedicated processing resources to the application; and
    in response to the application completing an operation associated with the request using the allocated dedicated processing resources, causing the application to sleep for a time period.

14. The computer program product according to claim 13, wherein a length of the time period is positively correlated with a difference of the total amount of resources exceeding the predetermined quota.

15. The computer program product according to claim 13, wherein causing the application to sleep for a time period comprises:
    in response to receiving a next request for the dedicated processing resources from the application, causing the application to sleep.

16. The computer program product according to claim 13, wherein the method further comprises:
    detecting utilization of the dedicated processing resources; and
    in response to the utilization exceeding a predetermined threshold, sending a signal to the application to instruct the application to defer sending of a next request for the dedicated processing resources.

17. The computer program product according to claim 13, wherein the method further comprises:
    receiving an indication of the predetermined quota from the application.

18. The computer program product according to claim 13, wherein the priority is associated with a service level agreement for the application.

* * * * *